United States Patent
Dickakian

[11] 3,721,658
[45] March 20, 1973

[54] METHOD OF PREPARING HIGH SOFTENING POINT THERMOPLASTICS

[75] Inventor: Ghazi Mourad Dickakian, Sterrebeck, Belgium

[73] Assignee: Esso Research and Engineering Company

[22] Filed: May 3, 1971

[21] Appl. No.: 139,866

[30] Foreign Application Priority Data

May 5, 1970 Great Britain.....................21,629/70

[52] U.S. Cl. .....................260/82, 117/132, 117/140, 117/161, 260/30.2, 260/33.6 UA
[51] Int. Cl. .............................................C08f 15/42
[58] Field of Search.........................................260/82

[56] References Cited

UNITED STATES PATENTS

| 1,627,054 | 5/1927 | Morrell et al. | 260/82 |
| 1,689,599 | 10/1928 | Ramage | 260/82 |
| 1,868,879 | 7/1932 | Broadhead et al. | 260/82 |
| 1,888,044 | 11/1932 | Morrell | 260/82 |
| 1,778,329 | 10/1930 | Mason | 260/82 |
| 1,965,191 | 7/1934 | Hyman | 260/82 |
| 2,011,053 | 8/1935 | Hyman | 260/82 |
| 2,828,293 | 3/1958 | Leary | 260/82 |
| 2,387,237 | 10/1945 | Ault | 260/82 |
| 2,387,259 | 10/1945 | Hall et al. | 260/82 |
| 3,238,116 | 3/1966 | Hamner et al. | 208/6 |
| 3,350,295 | 10/1967 | Hamner et al. | 208/4 |

OTHER PUBLICATIONS

Scheffler, Chem. ABS. 58 (1963) pp. 8653e

Primary Examiner—Harry Wong, Jr.
Attorney—Chasan & Sinnock and Michael Conner

[57] ABSTRACT

High softening point thermoplastic materials are prepared by the contacting of steam-cracked tar or fractions thereof with oxygen containing gases in the presence of a catalyst comprising salts of iron, copper, aluminum and zinc. The product materials result from the oxidative polymerization which occurs at temperatures in the range of 200° to 300° C. and are useful binder materials for the manufacture of fiberboard and other products.

8 Claims, No Drawings

METHOD OF PREPARING HIGH SOFTENING POINT THERMOPLASTICS

The invention relates to the conversion of tar and tar fractions derived from steam-cracked gas oil and naphtha or mixtures thereof into more useful products like high softening point thermoplastics. It is an important object of this invention to convert such steam-cracked tar and fractions thereof into products with useful properties, which are solid, brittle, high polarity, high carbon (Conradson), high softening point thermoplastics, by reacting them with oxygen or oxygen containing gases, preferably in the presence of a catalyst.

It is a particular advantage of the present invention that practically the whole viscous steam-cracked tar derived from gas oil and naphtha or mixtures thereof can be converted into solid high softening point thermoplastics with very high yields close to the theoretical value.

Accordingly the invention comprises a highly economic method of converting steam-cracked tar derived from gas oil and naphtha or mixtures thereof into more useful products such as high softening point polymeric thermoplastics with a high carbon (Conradson) content wherein the steam-cracked tar or fractions thereof are reacted with oxygen, or oxygen containing gases, preferably in the presence of a catalyst. It is an advantage of the present process that no solvents are needed so that the reaction, if desired, can be performed in one step. Purification or separation of the final product is not necessary.

The steam-cracked tar which is used as the starting material is obtained as the bottoms product when steam-cracking gas oil, naphtha or mixtures of such petroleum hydrocarbons at a temperature within the range of about 700° – 1,000° C, preferably of about 800° – 900° C. Typical processes are steam-cracking of gas oil or naphtha at a temperature of 800° to 900° C with a 50 to 70 percent conversion to $C_3$ olefin and lighter hydrocarbons during relatively short times (seconds) followed by stripping at a temperature of about 200° to 250° C to obtain the tar as a bottom product. Gas oil is to be understood as the liquid petroleum distillate with a viscosity and boiling range between kerosene and lubricating oil, and having a boiling range of about 200° to 400° C. Naphtha is a generic term for refined, partly refined or unrefined petroleum products and liquid products of natural gas not less than 10 percent of which distil below 175° C, and not less than 95 percent of which distil below 240° C when subjected to distillation according to the standard method referred to as ASTM-D-86.

The yield of the tar varies according to the type of feed to the steam-cracker. When naphtha is used as a feed the yield is about 2 – 5 wt percent, and when gas oil is used as a feed the yield is about 20 – 25 wt percent.

The invention is of particular importance for steam-cracked tar derived from gas oil or gas oil/naphtha mixtures, which tar is obtained in relatively high quantities and owing to its structure (a viscous, highly aromatic liquid) practically unsuitable for further uses. It is mainly used as a fuel and it has thus only fuel value.

The present invention provides thermoplastic products based on steam-cracked tar derived from gas oil or naphtha or mixtures thereof which is excellently suitable as a binder material. Chemically steam-cracked tar is composed of a mixture of aromatics, naphthenics and small amounts of thiophenic hydrocarbons, the quantities of which can be determined by NMR-spectroscopy. The ratio of each of these three components varies from one fraction of the tar to another according to the boiling points thereof. The lower boiling fractions of the tar contain aromatics and naphthenics in a ratio of about 1.0:1.0. The higher boiling fractions of the tar contain aromatics and naphthenics in a ratio of about 12 – 40:1.0. The figures may differ from one tar to another depending on the feed material from which it is derived and the conditions during steam-cracking. They illustrate, however, the general characteristics of this type of steam-cracked tar.

The tar can be distilled under reduced pressure to give a liquid fraction (b.p. 200° – 480° C, 760 mm Hg) and a high softening point pitch with a b.p. of 480° $C^+$ (the pitch content of a steam-cracked tar derived from gas oil is approximately 30 – 50 wt percent).

The following table gives the chemical compositions of three tar fractions:

| Fraction b.p. (° C 760 mm) | 250–370 | 370–480 | ← | 480+ | → |
|---|---|---|---|---|---|
| Wt % in steam-cracked tar | 30 | 27 | 13.5 | 6.5 | 22.3 |
| Molecular Weight (Mn) | 240 | 257 | 534 | 620 | 1172 |
| Aromatic/mole | 1.8 | 2.5 | 6.0 | 8.2 | 15.9 |
| Naphthenic/mole | 1.9 | 1.6 | 1.8 | 0.2 | 1.3 |
| Aromatic/naphthenic | 0.05:1.0 | 1.56:1.0 | 3.3:1.0 | 41:1.0 | 12.2:1.0 |

* Three Fractions separated by chromatography.

As stated already also the composition of steam-cracked tar varies according to the nature of the feed to the steam-cracker and cracking conditions. Broadly the physical characteristics can be indicated by the following ranges, which represent steam-cracked tars derived from gas oil and gas oil/naphtha mixtures.

| | |
|---|---|
| Specific gravity | 0.90–1.20 |
| Viscosity | |
| cs at 100° F ( ~ 38°C) | 42–5000 |
| cs at 210° F ( ~ 99° C) | 4.0–36.0 |
| Carbon (Conradson) wt % | 2.0–30.0 |
| Number average molecular weight (Mn) | 175–400 |
| Sulfur-content wt % | 0.1–4.0 |
| Asphaltene (heptane-insoluble) wt % | 2–35 |
| Softening point (Ring and Ball) ° C | 5–40 |
| | |
| Distillation Data | |
| IBP ° C | 200–300 |
| Fraction (IBP to 370° C) wt % | 15–47.0 |
| Fraction (370°C to 480° C) wt % | 20–50.0 |
| Fraction (480° C +) wt % | 20–55.0 |

According to the most important aspect of the present invention steam-cracked tar or fractions thereof as well as blends of the whole tar and tar fractions derived from gas oil or naphtha or mixtures thereof are polymerized to solid, brittle thermoplastics which have high softening points (up to 170° C) and high carbon Conradson content (30 – 60 wt percent), and which or excellently suitable as binding materials.

The reaction is of the type of an oxidative polymerization at elevated temperatures using oxygen or oxygen containing gases or an oxygen releasing compound, preferably in the presence of a catalyst.

Suitably air, or a combination of air and oxygen is injected under vigorous and continuous agitation at a rate of about 0.3 – 15, preferably 0.35 – 3.0 cc/minutes/gm of tar expressed as air into the steam-cracked tar products heated to 200° – 300° C, preferably in the presence of a catalyst.

The polymerization is allowed to proceed until a product with the desired softening point is obtained (generally about one-half to 16 hours) depending on air rate, temperature, agitation and catalyst content. The oxygen content of the final product will be in the range of 0.5 to 2.5 wt percent.

The polymerization can be either catalytic or non-catalytic but catalytic polymerization reduces substantially the reaction times to arrive at a desired softening point so that it is preferred to use a catalyst. Catalysts comprise salts of iron, copper, aluminum and zinc, such as chlorides and nitrates. Particularly effective are iron salts like ferric chloride and ferric nitrate. Ferric chloride may be used in anhydrous form ($FeCl_3$) or as a hydrate ($FeCl_3 \cdot 6H_2O$) or in aqueous solution, for instance a 40 percent aqueous solution.

The amounts of catalyst will vary dependent on the reaction conditions, amounts within the range of 0.05 – 2.0 wt percent giving good results.

The desired solid, brittle, thermoplastic binder products with high softening points and carbon contents which are obtained possess broadly the following characteristics:

| | |
|---|---|
| 1. Specific gravity | 1.10–1.25 |
| 2. Break point Fraass (°C) | 1–20 |
| 3. Ductility at 25° C (cm) | 0.1–1.0 |
| 4. Softening point (Ring and Ball) °C | 40–170 |
| 5. Penetration at 25° C/100 g/5 sec. (mn) | 1–3 |
| 6. Carbon (Conradson) wt % | 30–60 |
| 7. Coking value (Alcan method wt %) | 30–60 |
| 8. Ash content (wt %) | 0.05–0.5 |
| 9. Oxygen content (wt %) | 0.5–2.5 |
| 10. Sulfur content (wt %) | 0.1–4.0 |
| 11. Aromatics protons/total saturated protons ratio (NMR) | 100:125 to 100–150 |
| 12. Beta-resin content (wt %) | 5–20 |

* Note : Beta-resin is the difference between the benzene insoluble and quinoline insoluble.

The reaction can be performed in one step because purification or separation of the polymeric product is not necessary. If desired, however suitable solvents may be added.

Conveniently, atmospheric pressure is used, but higher pressures may be used, if desired.

The thermoplastic products are especially of importance as binders for various materials. Apart from the increased softening point and carbon Conradson content the oxidative polymerization introduces polar groups into the product which can be expressed as beta-resin content (difference between benzene insoluble content and quinoline insoluble content). These polar groups are important parameters in determining the adhesive properties of the thermoplastic product in relation to surfaces of pulp fiber, metals as well as coke and coal surfaces. The beta-resin content in the oxidized product varies from 5 to 20 wt percent. It is an advantage that the softening points of the products according to the invention can be varied within the wide range of 40° – 170° C to suit various uses.

Thus the products of the invention can be used satisfactorily as binders in mechanical pulp to make fiberboard (insulation material) or to make fiber impregnated pipes for drainage. An interesting application is their use as binders for coal dust to produce smokeless coal briquettes or coke briquettes. In such a process coal, the binder and water, usually in the form of steam are mixed at a temperature of about 80° – 95° C, whereafter the mixture is pressed into briquettes (green briquettes) which are then subjected to curing at a temperature of about 300° – 400° C during about 1 to 4 hours. The baked briquettes are used as a solid fuel material. The binders according to the invention when used for the above purpose provide green briquettes with a high crushing strength (200 – 250 lbs) and baked briquettes which apart from having a high crushing strength are smokeless when used as a solid fuel for domestic or industrial uses. The green briquettes as well as the cured ones can be further subjected to coking at a temperature of about 800° to 1,000° C (for about 10 to 60 min.) to produce coke briquettes.

The products according to the invention may be used as binders solely or in combination with other binders, like coal tar pitch, asphalt and thermosetting or thermoplastic resins, the product according to the invention forming the major compound.

It is an important advantage of the present invention that the whole viscous steam-cracked tar can be converted in one step into useful high-softening point thermoplastics. It is possible, however, to treat according to the process of the invention fractions of the tar, such as the pitch or the fraction with a b.p. of 370° – 480° C, as well as blends of the whole tar with either low- or high boiling fractions thereof.

The pitch obtained by a high vacuum distillation of the steam-cracked tar may for example be added to the whole tar to increase its aromatic content.

Especially when polymers are desired with relatively high softening points (above 100° C) and high carbon content (more than 40 percent Conradson), which polymers possess a high thermal stability, it is of advantage to react the high boiling fraction of the steam-cracked tar (boiling point 480° C$^+$) according to the process of the invention in the presence of a catalyst as above described.

Also the liquid fraction boiling between 370° and 480° C can be polymerized, preferably catalytically, to thermoplastic products with a softening point of 40° to 120° C. According to NMR spectroscopy these liquid middle fractions of the tar contain less aromatics than other fractions (ratio aromatic to naphthenic being about 1.3 to 1). Thus the thermoplastic products from this fraction have somewhat different physical properties, especially noticeable when their softening points are relatively low. They are soluble in non-aromatic solvents and are more flexible (in the lower softening point range) than materials derived from the whole tar, which make them suitable as road binders.

Two types of steam-cracked tar varying in their physical characteristics and chemical compositions were used to illustrate the invention. The oxidative-polymerization of two fractions of steam-cracked tar is also illustrated. For its purpose a higher fraction, a solid (b.p. 480° C+) and a second fraction, a liquid (b.p. 370° – 480° C+) were used. Physical data of the four starting materials used are given in Table 1.

Examples 1 to 3 illustrate the catalytic oxidative polymerization of steam-cracked tar No. 1 using anhydrous ferric chloride and 4 to 6 the non-catalytic oxidative polymerization of the same tar. Examples 7 and 8 illustrate the catalytic oxidative-polymerization of steam-cracked tar No. 1 using hydrated ferric chloride (FeCl$_3$ · 6H2°) and Examples 9 and 10 illustrate the same reaction using an aqueous solution of ferric chloride (40 wt percent). The reaction conditions are given in Table 2. All reactions were carried with vigorous stirring to increase the diffusion of the oxygen in the tar. For this purpose a blade mixer was used rotating at a speed of 170 rpm.

Examples 11 and 12 illustrate the catalytic oxidative polymerization of tar No. 2 which has a low softening point and a carbon (Conradson) content, as indicated in Table 3.

Examples 13, 14, and 15 illustrate the catalytic oxidative polymerization of the solid tar fraction (softening point 100° C) and b.p. 480° C+, of which data are given in Table 4. Example 16 illustrates the catalytic oxidative polymerization of the liquid tar fraction (b.p. 370° – 480° C) to high softening point thermoplastics, of which data are given in Table 5. Example 17 illustrates a large-scale trial.

TABLE I.—PHYSICAL DATA OF STEAM-CRACKED TARS AND FRACTIONS USED IN THE EXAMPLES

|  | Tar No. 1[a] | Tar No. 2[b] | Solid fraction (B.P. 480° C.+) | Liquid fraction (B.P. 370–480° C.) |
|---|---|---|---|---|
| Specific gravity at 25° C. | 1.159 | 1.059 | 1.160 | 1.080 |
| Sulfur content (wt. percent) | 3.9 | 4.0 | | |
| Softening point (° C.) | 35 | 10 | 100 | [c] |
| Asphaltene content (n-heptane insoluble) | 29.8 | 2.8 | 50 | Nil |
| Number average molecular weight ($\overline{Mn}$) | 335 | 286 | 400–500 | 150 |
| Viscosity (cs.) at 100° F. | 413 | 430 | | 50.0 |
| Carbon (Conradson) (wt. percent) | 28.0 | 3.0 | 50.0 | 2.0 |
| Ash content (wt. percent) | <0.1 | <0.1 | <0.1 | <0.1 |
| Distillation data: | | | | |
| IBP–370° C. (wt. percent) | 18 | 24 | Nil | Nil |
| 370–480° C. (wt. percent) | 29 | 45 | Nil | 100 |
| 480° C.+ (wt. percent) | 52 | 29 | 100 | Nil |

[a] Derived from gas oil.
[b] Derived from gas oil/naphtha blend (2:1).
[c] Liquid at 0° C.

TABLE 2.—OXIDATIVE-POLYMERIZATION OF STEAM-CRACKED TAR NO. 1

| Example | S.C. tar (g.) | Air rate, (cc./min./g.) | Type of catalyst | Catalyst (wt. percent) | Polymerization conditions Temp. (° C.) | Time (hours) | Yield (g.) | Polymerized tar Yield (wt. percent) | Soft. point (° C.) (R and B) | Carbon (Conradson) |
|---|---|---|---|---|---|---|---|---|---|---|
| 1 | 150 | 13 | Anhydrous FeCl$_3$ | 1.0 | 230 | 1.0 | 143 | 95 | 87 | 3 |
| 2 | 150 | 13 | do | 1.0 | 230 | 2.5 | 144 | 96 | 105 | 40 |
| 3 | 150 | 13 | do | 1.0 | 230 | 5.0 | 143 | 95 | 133 | 54.8 |
| 4 | 150 | 13 | | Nil | 230 | 1.0 | 143 | 95 | 57 | |
| 5 | 150 | 13 | | Nil | 230 | 2.5 | 141 | 94 | 69 | 32 |
| 6 | 150 | 13 | | Nil | 230 | 5.0 | 143 | 95 | 96 | 35 |
| 7 | 150 | 13 | FeCl$_3$6H$_2$O | 1.0 | 230 | 2.5 | 130 | 88 | 160 | 55 |
| 8 | 150 | 13 | FeCl$_3$6H$_2$O | 0.5 | 230 | 2.5 | 135 | 91 | 126 | 43 |
| 9 | 150 | 13 | 40 wt. percent aqueous solution FeCl$_3$ | 1.0 | 230 | 2.5 | 135 | 91 | 169 | 53.0 |
| 10 | 150 | 13 | do | 0.5 | 230 | 2.5 | 135 | 91 | 147 | 53. |

TABLE 3.—OXIDATIVE-POLYMERIZATION OF STEAM-CRACKED TAR NO. 2

| Example | S.C. tar (g.) | Air rate (cc./min./g.) | Type of catalyst | Catalyst (wt. percent) | Polymerization conditions Temp. (° C.) | Time (hours) | Yield (g.) | Polymerized tar Yield (wt. percent) | Soft. point (° C.) |
|---|---|---|---|---|---|---|---|---|---|
| 11 | 150 | 13 | Anhydrous FeCl$_3$ | 1.0 | 230 | 2.5 | 132 | 87 | 91 |
| 12 | 150 | 13 | do | 1.0 | 230 | 5.0 | 137 | 92 | 138 |

TABLE 4.—OXIDATIVE-POLYMERIZATION OF STEAM-CRACKED TAR FRACTION (B.P. 480° C.+)

| Example | Tar fraction (g.) | Air rate (cc./min./g.) | Anhydrous FeCl$_3$ wt. percent | Polymerization conditions Temperature (° C.) | Time (hours) | Yield (g.) | Polymerized tar fraction Yield (wt. percent) | Softening point (R and B) | Carbon (Conradson) (wt. percent) |
|---|---|---|---|---|---|---|---|---|---|
| 13 | 150 | 13 | 1.0 | 230 | 1.0 | 143 | 95.3 | 123.8 | 44 |
| 14 | 150 | 13 | 1.0 | 230 | 2.5 | 142 | 94.6 | 134 | 44 |
| 15 | 150 | 13 | 1.0 | 300 | 2.5 | 140 | 93.3 | 144 | 50 |

TABLE 5.—OXIDATIVE-POLYMERIZATION OF LIQUID FRACTION (B.P. 370–480° C.) OF STEAM-CRACKED TAR

| Example | Tar fraction (g.) | Air rate (cc./min./g.) | Type of catalyst | Catalyst (wt. percent) | Polymerization conditions Temperature (° C.) | Time (hours) | Yield (g.) | Polymerized tar fraction Yield (wt. percent) | Soft. point (R and B) (° C.) | Carbon (Conradson) (wt. percent) |
|---|---|---|---|---|---|---|---|---|---|---|
| 16 | 150 | 13 | Anhydrous FeCl$_3$ | 1.0 | 230 | 5.0 | 132 | 87 | 106 | 33.6 |

EXAMPLE 17

45 ton of gas oil steam-cracker tar (sp. gr. at 20° C = 1.150 soft. point = 24° C, carbon Conradson = 30) was introduced into a 50 ton carbon-steel reactor. The catalyst (40 percent aqueous solution of ferric chloride) was pumped into the reactor under the level of the tar, in an amount of 1.0 wt percent.

The catalyst-tar mixture was then heated to 200° C by circulating the tar through a heat exchanger heated with hot gas oil.

Superhead steam was injected at the top of the reactor (350 Kg/hour) during the oxidation for safety reasons.

Air at the rate of 0.35 cc/minute/gram of tar was introduced at the bottom of the reactor to effect the polymerization of the tar.

The temperature in the reactor was controlled at 220° – 230° C by circulating the tar through a heat exchanger cooled with hot gas oil (150° C).

The softening point of the polymerized tar was determined every hour. Table 6 gives the increase in softening point for a period of 12 hours. The final softening point was 116° – 118° C (Ring and Ball) the yield of the polymerized tar was 85 percent wt. During the oxidation 13 – 14 wt percent of light oil was separated as overhead, which oil was condensed and separated from water.

TABLE 6

| Time (hrs) | Soft. Point (° C) Ring and Ball |
|---|---|
| 0 | 24 |
| 1 | 30 |
| 2 | 45 |
| 3 | 58 |
| 4 | 66 |
| 5 | 76 |
| 7 | 85 |
| 8 | 90 |
| 10 | 105 |
| 12 | 115 |

The properties of the final product were as follows:

| | |
|---|---|
| Sp. gr. (20/20° C) | 1.1800 |
| Coking Value (Alcan), wt % | 43–44 |
| Benzene Insoluble wt % | 18.5 |
| Quinoline Insoluble wt % | 0.06 |
| β-Resin wt % | 18.0 |
| Viscosity (cps) | |
| 160° C | 20,000 |
| 180° C | 3680 |
| 200° C | 933 |
| Sulfur (wt %) | 1.0–3.5 |

What is claimed is:

1. Process of preparing thermoplastic materials wherein steam-cracked tar having an initial boiling point between about 200° C. and about 300° C. or higher boiling fractions thereof derived from gas oil or naphtha or mixtures thereof, is oxidatively polymerized at temperatures in the range of 200°–300° C. by injection under vigorous agitation of oxygen containing gases at the rate of 0.3 to 15 c.c./minutes/gm. of tar in the presence of a catalyst selected from the group consisting of salts of iron, copper, aluminum and zinc, said catalyst being present in an amount of 0.05–2.0 wt. percent, during a time period sufficient to raise the softening point to a value within the range of 40°–170° C. (Ring and Ball).

2. Process according to claim 1, wherein the reaction is carried out until 0.5 to 2.5 wt percent of oxygen is introduced in the tar.

3. Process according to claim 1, wherein air is injected at a rate of 0.35 – 3 cc/minutes/gm.

4. Process according to claim 1, wherein the steam-cracked tar to be polymerized is derived from gas oil/naphtha mixtures, said tar having the following characteristics:

| | |
|---|---|
| Specific Gravity | 0.90–1.20 |
| Viscosity | |
| cs at 100° F (38° C) | 42–5000 |
| cs at 210° F (94° C) | 4.0–36.0 |
| Carbon Conradson wt % | 2.0–30.0 |
| Number Average Molecular Weight Mn | 175–400 |
| Sulfur Content wt % | 0.1–4.0 |
| Asphaltene (Heptane-insoluble wt % | 2–35 |
| Softening Point (Ring and Ball) ° C | 5–40 |

5. Process according to claim 1, wherein the high boiling pitch fraction of the tar (b.p. 480° C$^+$) is polymerized.

6. Process according to claim 1, wherein combinations of the whole tar and fractions thereof are polymerized.

7. Process according to claim 1, wherein a middle fraction of the tar with b.p. 370° – 480° C is polymerized.

8. Process according to claim 1, wherein the catalyst is ferric chloride.

* * * * *